(12) United States Patent
Brockmüller et al.

(10) Patent No.: US 6,217,223 B1
(45) Date of Patent: Apr. 17, 2001

(54) CAGE-MOUNTED SEAL USED IN ROLLING BEARINGS

(75) Inventors: Uwe Brockmüller, Oberwerrn; Padelis Katsaros, Schweinfurt; Rainer Schürger, Schwanfeld, all of (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/275,820

(22) Filed: Mar. 25, 1999

(30) Foreign Application Priority Data

Mar. 27, 1998 (DE) .............................. 198 13 587

(51) Int. Cl.⁷ .................................... F16C 33/38
(52) U.S. Cl. ........................ 384/523; 384/470; 384/485
(58) Field of Search .................. 384/523, 470, 384/482, 485, 483, 484, 486, 487; 277/407, 50, 53, 95

(56) References Cited

U.S. PATENT DOCUMENTS

| 2,557,476 | 6/1951 | Schwitter ........................... 308/201 |
| 2,856,246 | 10/1958 | Gaubatz ........................... 308/187.2 |
| 3,113,812 | 12/1963 | Dotter ............................... 308/187.1 |
| 3,524,237 | 8/1970 | Elmore ............................... 29/148.4 |
| 4,325,591 | * 4/1982 | Otto ............................... 308/187.2 |
| 4,692,040 | * 9/1987 | Ebaugh et al. ........................ 384/484 |
| 4,699,529 | 10/1987 | Scholl et al. ........................ 384/560 |
| 5,618,488 | * 4/1997 | Tadic et al. ........................ 264/478 |

FOREIGN PATENT DOCUMENTS

| 27 53 340 | 5/1979 | (DE) . |
| 3835315 | * 10/1988 | (DE) ................................ 384/470 |
| 2585420 | 1/1987 | (FR) . |
| 2049070 | * 12/1990 | (GB) ................................ 384/470 |

* cited by examiner

Primary Examiner—Rodney H. Bonck
Assistant Examiner—Tisha D. Lewis
(74) Attorney, Agent, or Firm—Burns, Doane, Swecker & Mathis, L.L.P.

(57) ABSTRACT

A cage-guided seal is provided with an annular support body, formed preferably from sheet metal, and punched-out retention sections that are adapted to engage the side ring of a standard commercial cage. The peripheral edges of the support body extend close to the sealing surfaces of the inner and outer bearing races and are provided with sealing lips of vulcanized elastomers that engage the inner and outer bearing races.

18 Claims, 1 Drawing Sheet

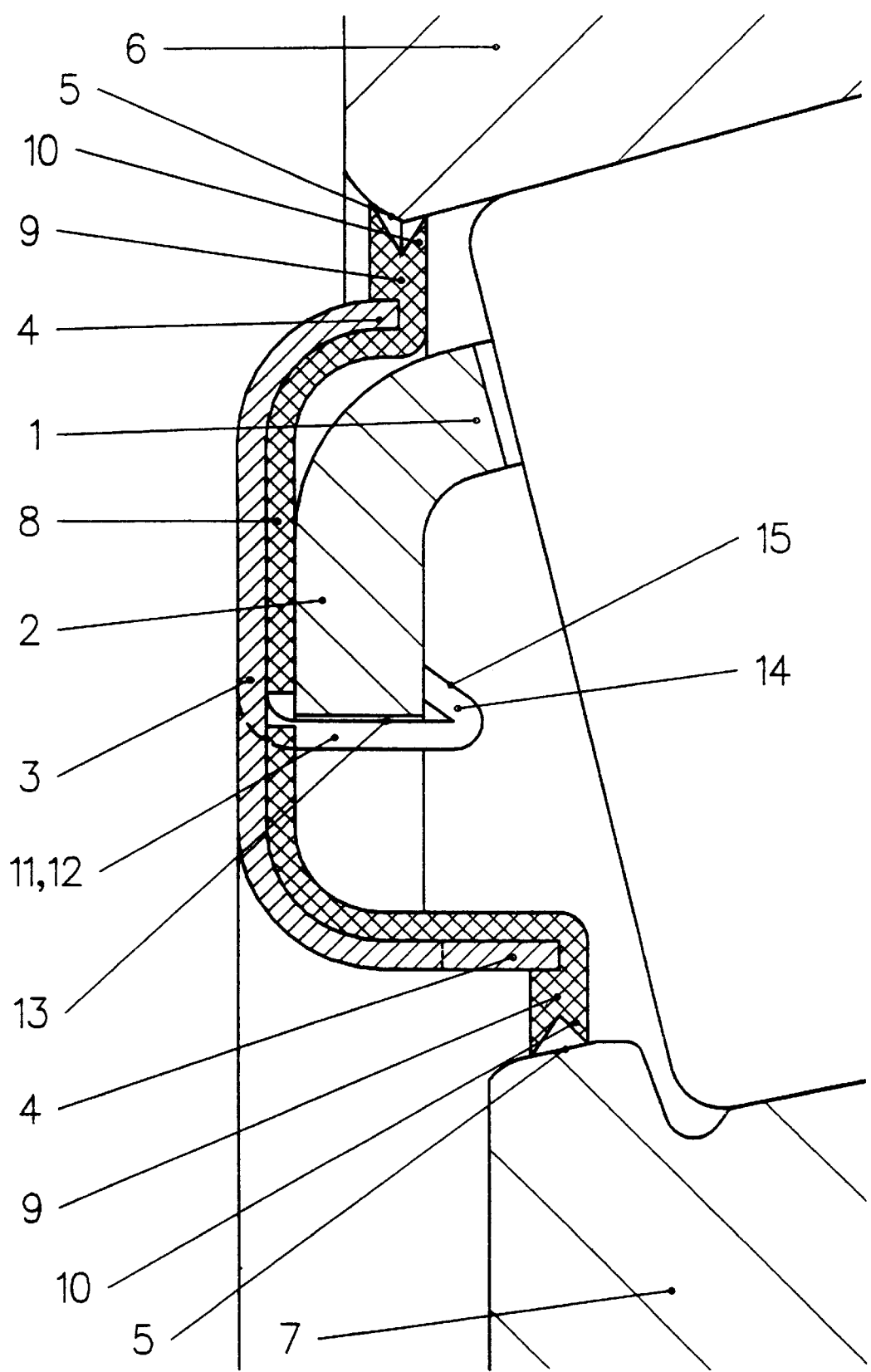

CAGE-MOUNTED SEAL USED IN ROLLING BEARINGS

This application corresponds to and claims priority under 35 U.S.C. §119 with respect to German Patent Application No. P 198 13 587.4 filed on Mar. 27, 1998, the entire content of which is incorporated herein by reference.

FIELD OF THE INVENTION

The present invention generally relates to rolling bearings. More particularly, the present invention pertains to a cage-guided seal used in rolling bearings.

BACKGROUND OF THE INVENTION

DE 27 53 340 discloses an elastomer seal that is attached with snap-on elements to the cage of a tapered rolling bearing. The one-piece seal is provided with long-armed sealing lips and for this reason can only be guided in a rather imprecise manner on the sealing surfaces. Because of this, large-surface starting sections are also provided on the seal to impart a certain positioning guidance to the seal, but the seal exhibits a rather poor sealing function. In situations where pressure differentials exist between the bearing chamber and the environment, for example if there are temperature fluctuations in the bearings, the sealing and guidance function performed by the seal is less than adequate. It is also necessary that the cage be equipped with retention devices for the seal, thus requiring a specially outfitted cage.

A need thus exists for a cage-guided seal used in rolling bearings having improved stability, sealing function, and starting behavior, while at the same time permitting the use of standard series cages.

SUMMARY OF THE INVENTION

The present invention provides a seal that includes a support body of a hard material with molded-on or integrally formed retention sections. The retention sections are adapted to be snap-fit onto the cage of the rolling bearing to retain the seal in place on the rolling bearing. By producing the support body from a hard material, for example from sheet metal, and by virtue of the rigid connection with the cage, highly flexible and quite fine sealing lips that start in a linear shape and in axial direction require extremely small starting surfaces can be used at the sealing places. The seal is able to provide the necessary sealing and guidance function even in the presence of a pressure differential.

According to one aspect of the invention, a rolling bearing includes inner and outer rings, at least one rolling element disposed between the inner and outer rings, and a cage which holds the rolling element. A cage-guided seal is mounted on the cage and includes a support portion formed of a first material and sealing lips formed of a second material. The sealing lips engage the inner and outer rings, and the first material is more rigid than the second material. The support portion is provided with at least one retention section which retains the seal in place on the cage.

According to another aspect of the present invention, a cage-guided seal for rolling bearings having inner and outer rings and a cage for holding at least one rolling element between the inner and outer rings includes a support body, a sealing lip provided on the support body for engaging the inner ring, and a sealing lip provided on the support body for engaging the outer ring. The support body is fabricated of a material that is more rigid than the sealing lips, and the support body includes at least one integral retention section for being snapped in on the cage.

Another aspect of the present invention includes a cage-mounted seal for rolling bearings having inner and outer rings and a cage for holding at least one rolling element between the inner and outer rings. The seal includes a support portion and a sealing portion, with the support portion being fabricated of a material that is more rigid than the material from which the sealing portion is fabricated. The sealing portion is provided on the support portion and includes a sealing lip provided at one free end of the support portion for engaging the inner ring and a sealing lip provided at an opposite free end of the support portion for engaging the outer ring. The support portion has at least one punched out portion forming a retention section that is adapted to be snapped into place on the cage.

BRIEF DESCRIPTION OF THE DRAWING FIGURE

The foregoing and additional features and characteristics of the present invention will become more readily apparent from the following detailed description considered with reference to the accompanying drawing figure which is a partial longitudinal cross-section of a tapered roll bearing provided with a seal in accordance with the present invention.

DETAILED DESCRIPTION OF THE INVENTION

The seal according to the present invention is usable in conjunction with a tapered roll bearing that is a standard commercial product with a standard or unchanged cage 1. The cage is produced from sheet metal and is provided with a disk-shaped side ring 2.

The rolling bearing includes an outer ring 6 and an inner ring 7, with rollers provided between the inner and outer rings. Both the inner and outer rings 7, 6 possesses a sealing surface 5.

The seal is defined by a hard support body 3 formed from sheet metal and having, in longitudinal cross-section, a generally U-shaped profile. The support body 3 forms a support portion of the seal. The seal also includes a seal portion in the form of an elastomer coating 8, preferably a vulcanized elastomer, that is located between the contact surface of the cage 1 and the support body 3 as seen in the drawing figure. The seal is thus defined by the support portion 3 which is made of a material that is more rigid that the material from which the seal portion 8 is formed.

The support body 3 possesses free ends 4 that reach or extend close to the sealing surfaces 5 of the outer ring 6 and the inner ring 7. The inner surface of the support body 3 which faces towards the rollers of the bearing is coated with the elastomer coating 8. The elastomer coating 8 covers and extends beyond both of the free ends 4 of the support body 3 to form annular seals 9 at opposite ends of the seal. These annular seals 9 are oriented radially outwardly and engage the respective sealing surfaces 5 of the outer ring 6 and the inner ring 7 at two spaced apart flexible sealing rings 10.

Several tongues 11 distributed along the circumference of the support body 3 are punched out or cut out from the support body 3. These tongues 11 obtain the illustrated shape by reshaping the cut out or punched out portion of the support body 3. The tongues 11 form retention sections 12 for attachment at the side ring 2 of the cage 1. For this purpose, the outer surfaces of the retention sections 12 or tongues 11 function as centering surfaces 13 because they are in close contact with the front surfaces of the side ring 2, thereby defining the position of the sealing. The free ends of the retention section 12 are shaped as snap-in elements 14 that clamp behind the side ring 2 of the cage 1. The snap-in elements 14 possess ramps 15. Thus, as the cage guided seal is inserted into the roll bearing, the ramps 15 of the tongues 11 slide along the side ring 2 of the cage 1 until the snap-in elements 14 snap around and engage the back of the side ring 2 of the cage 1.

As can be seen from the above-description and the illustration in the drawing figure, the installation of the cage guided seal is rather simple and easy. The seal can be simply pushed onto the roll bearing whereupon it engages the roll bearing, including the cage 1, in a form-fitting manner. The elastomer coating 8 advantageously forms an axial preload and an effective seal between the cage 1 and the seal.

The principles, preferred embodiment and mode of assembly of the present invention have been described in the foregoing specification. However, the invention which is intended to be protected is not to be construed as limited to the particular embodiment described. The embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A rolling bearing comprising:
   an inner ring;
   an outer ring;
   at least one rolling element disposed between the inner and outer rings;
   a cage for holding the at least one rolling element; and
   a cage-guided seal mounted on the cage, said seal including a support portion formed of a first material and sealing lips formed of a second material, said sealing lips engaging the inner and outer rings, the first material being more rigid than the second material, the support portion being provided with at least one retention section which retains the seal in place on the cage.

2. The rolling bearing according to claim 1, wherein the support portion is formed of sheet metal, and said at least one retention section is formed as a cut-out portion of the sheet metal.

3. The rolling bearing according to claim 2, wherein the inner and outer ring each possess a sealing surface, said support portion possessing a profile that is U-shaped in longitudinal section having free ends located adjacent the sealing surfaces on the inner and outer rings, said sealing lips being provided at the free ends of the support portion.

4. The rolling bearing according to claim 1, wherein the inner and outer ring each possess a sealing surface, said support portion possessing a profile that is U-shaped in longitudinal section having free ends located adjacent the sealing surfaces on the inner and outer rings, said sealing lips being provided at the free ends of the support portion.

5. The rolling bearing according to claim 1, wherein the sealing lips form a part of an elastomer coating that is located between a contact surface of the cage and the support portion.

6. The rolling bearing according to claim 1, wherein the at least one retention section is provided with a centering surface that cooperates with the cage.

7. The rolling bearing according to claim 1, wherein the cage includes a side ring, and said at least one retention section is provided with a snap-in element that clamps behind the side ring of the cage.

8. A cage-guided seal for rolling bearings having inner and outer rings and a cage for holding at least one rolling element between the inner and outer rings, the seal comprising a support body, a sealing lip provided on the support body for engaging the inner ring and a sealing lip provided on the support body for engaging the outer ring, said support body being fabricated of a material that is more rigid than the sealing lips, said support body including at least one integral retention section for being snapped in on the cage.

9. The cage-guided seal according to claim 8, wherein the support body is formed of sheet metal, and said at least one retention section is formed as a cut-out portion of the sheet metal.

10. The cage-guided seal according to claim 9, wherein said support body possesses a profile that is U-shaped in longitudinal section having free ends adapted to be located adjacent sealing surfaces on the inner and outer rings, said sealing lips being provided at the free ends of the support body.

11. The cage-guided seal according to claim 8, wherein said support body possesses a profile that is U-shaped in longitudinal section having free ends adapted to be located adjacent sealing surfaces on the inner and outer rings, said sealing lips being provided at the free ends of the support body.

12. The cage-guided seal according to claim 8, wherein the sealing lips form a part of an elastomer coating that extending between free ends of the support body.

13. The cage-guided seal according to claim 8, wherein the at least one retention section is provided with a centering surface that is adapted to cooperate with the cage.

14. The cage-guided seal according to claim 8, wherein said at least one retention section is provided with a snap-in element that is adapted to clamp behind a side ring of the cage.

15. A cage-guided seal for rolling bearings having inner and outer rings and a cage for holding at least one rolling element between the inner and outer rings, the seal comprising a support portion and a sealing portion, the support portion being fabricated of a material that is more rigid than the material from which the sealing portion is fabricated, the sealing portion being provided on the support portion and including a sealing lip provided at one free end of the support portion for engaging the inner ring and a sealing lip provided at an opposite free end of the support portion for engaging the outer ring, said support portion having at least one punched out portion forming a retention section that is adapted to be snapped in on the cage.

16. The cage-guided seal according to claim 15, wherein the support portion is formed of sheet metal.

17. The cage-guided seal according to claim 15, wherein said support portion possesses a profile that is U-shaped in longitudinal section.

18. The cage-guided seal according to claim 15, wherein said at least one retention section is provided with a snap-in element that is adapted to clamp behind a side ring of the cage.

* * * * *